United States Patent [19]

Giersberg et al.

[11] Patent Number: 5,116,468
[45] Date of Patent: May 26, 1992

[54] METHOD FOR THE PREPARATION OF FINELY DIVIDED, ELECTRICALLY CONDUCTIVE TIN(IV) OXIDE

[75] Inventors: Joachim Giersberg, Marl-Sinsen; Dirk Naumann, Essen-Kupferdreh; Frank Honselmann, Herten, all of Fed. Rep. of Germany

[73] Assignee: Th. Goldschmidt AG, Essen, Fed. Rep. of Germany

[21] Appl. No.: 776,554

[22] Filed: Oct. 15, 1991

[30] Foreign Application Priority Data

Oct. 29, 1990 [DE] Fed. Rep. of Germany ....... 4034353

[51] Int. Cl.⁵ ................................................ C25B 1/00
[52] U.S. Cl. ........................................................ 204/96
[58] Field of Search ..................................... 204/86, 96

[56] References Cited

FOREIGN PATENT DOCUMENTS 0235968  9/1987  European Pat. Off. .

Primary Examiner—T. M. Tufariello
Attorney, Agent, or Firm—Toren, McGeady & Associates

[57] ABSTRACT

A method is disclosed for the preparation of finely divided, electrically conductive tin(IV) oxide. In a first step tin(IV) oxalate and/or oxalates of polymeric tin(IV) compounds are obtained by electrolysis, in which the anode consists of tin or a tin alloy which contains a doping metal, and the cathode consists of a metal or graphite. The two electrodes are separated by a diaphragm or an organic membrane which is permeable to hydrogen ions and oxalic acid solution is used as electrolyte. Tin(IV) oxide is prepared in the second step by calcining the oxalates obtained from the solution of tin(IV) oxalate and/or oxalates of polymeric tin(IV) compounds, to which known doping agents have been added in conventional amounts.

10 Claims, No Drawings

METHOD FOR THE PREPARATION OF FINELY DIVIDED, ELECTRICALLY CONDUCTIVE TIN(IV) OXIDE

BACKGROUND OF INVENTION

This invention is directed to a method for the preparation of finely divided, electrically conductive tin(IV) oxide, wherein an aqueous solution of tin(IV) oxalate and/or the oxalates of polymeric tin(IV) compounds is prepared in a first step, and the desired tin(IV) oxide is obtained from this aqueous solution in a second step. The invention is directed also to the use of the tin(IV) oxide obtained by the inventive method, as a filler or pigment in plastics, lacquers, paints, papers, textiles and toners.

The application of electrically conductive and infrared-reflecting tin oxide layers on substrates, particularly on glass, has long been known. Frequently, such electrically conductive and infrared-reflecting tin oxide layers on glass are prepared by the pyrolytic decomposition of liquid preparations, which contain, essentially, one or more tin parent compounds and one or more suitable fluoride-containing doping compounds.

The electrical conductivity is produced by defects in the respective tin oxide layers, such defects being largely formed by the doping material that has been added. Defect terms or donor terms are produced which are only a little below the conduction band and from which, if necessary, electrons can be brought into the conduction band with little expenditure of energy. This is not the case with pure, undoped tin oxide because of the forbidden zone that exists between the valency band and the conduction band.

Electrically conductive pigments are required to satisfy the need for electrical conductivity or antistatic adjustment of various solid and liquid industrial products, such as plastics, paints and lacquers, papers, toners and textiles. Aside from metal powders and graphite, which necessarily cause a dark coloration in such industrial products, powdery semiconductors are frequently used. For this purpose, it is desirable to employ finely grained semiconductor pigments of high electrical conductivity or low specific resistance which are as lightly colored as possible or even white.

In EP-A-0 235 968, a transparent aqueous solution is described which contains a tin compound and which is obtained by the reaction of tin carboxylate, particularly tin oxalate, with hydrogen peroxide in the ratio of 1:1.5 or above in an aqueous medium. At the same time, a doping agent can be present in the reaction system in an amount of 0.01 to 0.35 moles per mole of tin carboxylate. This transparent, aqueous solution can then be calcined at a temperature above 400° C.

However, this method is not satisfactory in every respect. Tin(II) oxalate, which is preferably used as starting material, must first of all be synthesized from metallic tin or a tin(II) compound. Since tin(II) oxalate is rather insoluble in water, the oxidation with hydrogen peroxide proceeds in an aqueous medium in a heterogeneous phase. Moreover, tin(IV) oxide obtained by calcining at temperatures of more than 500° C. is crystalline to a considerable extent, whereas for application reasons, amorphous oxide powder is desired.

SUMMARY OF THE INVENTION

It is an object of the present invention to provide a method which yields aqueous solutions which contain tin(IV) oxalate and/or oxalates of polymeric tin(IV) compounds directly from metallic tin in one step.

Another object of the invention is the provision of a method wherein predominantly finely divided, amorphous tin(IV) oxide is obtained, after a calcining step, which has the desired conductivity, the desired settling volume and bulk factor and other properties which are important for use, such as a light color.

Still another object of the invention is the use of tin(IV) oxide prepared according to the invention for fillers and pigments.

According to the invention, it has been discovered that tin(IV) oxide having the desired characteristics is obtained by a method in which, in a first step, an aqueous solution of tin(IV) oxalate and/or oxalates of polymeric tin(IV) compounds is obtained by electrolysis wherein:

(a) the anode is comprised of tin or a tin alloy which contains a doping metal,
(b) the cathode is comprised of a metal or graphite,
(c) the two electrodes are separated from one another by a diaphragm or an organic membrane which is permeable to hydrogen ions and
(d) aqueous oxalic acid is used as electrolyte and in the second step, tin(IV) oxide is produced by calcining the oxalate obtained from the solution of tin(IV) oxalate and/or the oxalates of polymeric tin(IV) compounds produced in the first step, with the proviso that when the alloy is comprised of tin, a doping agent is added in the usual amount to the aqueous solution.

DESCRIPTION OF THE INVENTION

It is surprising that tin(IV) ions are formed at the anode by electrolysis, since tin is usually oxidized only to the divalent stage in an acidic solution. Possibly, this may be caused by a passivation of the anode by tin(II) oxalate, which has a low solubility. As a result of the passivation, oxygen is evolved at the anode and oxidizes the tin(II) ions to tin(IV) ions.

Preferably, a saturated aqueous oxalic acid solution containing excess, undissolved oxalic acid is used as electrolyte. If, on the other hand, an oxalic acid solution is used which is depleted in the course of the electrolysis, the possibility exists that basic tin(IV) oxalates will be formed, the structure of which can be represented in simplified fashion by the formula $(OH)_2Sn(C_2O_4)$.

On continuing the electrolysis without further addition of oxalic acid, it was surprisingly found that the tin content increases further. For example, it is possible to produce aqueous solutions of oxalic acid with a high tin content. Solutions with more than 400 g/L of dissolved tin can be obtained at an oxalic acid content of less than 50 g/L. It is suspected that it is a question here of the oxalates of polymeric tin(IV) compounds. Such solutions cannot be prepared by chemical oxidation, such as the oxidation with hydrogen peroxide described in EP-A-0 235 968.

Anode space and cathode space should be separated electroconductively from one another. Moreover, the charge exchange should be ensured by hydrogen ions and by using ceramic diaphragms or organic membranes. However, the transfer of tin ions into the cathode space should be prevented.

As diaphragms, 6 to 10 mm thick inorganic diaphragms which have been tightly sintered at a temperature above 1,000° C. or 0.1 to 1.0 mm thick organic diaphragms are preferably used.

Preferred as organic membranes are 0.1 to 1.0 mm thick ion exchange membranes. These membranes consist of an organic polymer or a supporting fabric with ion exchange resins which have ionic groups. Such membranes are obtainable commercially, for example, under the name of Nafion.

Metallic tin or a tin alloy is used as anode material. The alloy can contain the doping material in the amount desired for doping the tin oxide. A suitable alloying metal is antimony. Its usefulness for doping tin oxides is known from the art.

Any type of inert electrode can be used as cathode material. Preferably, electrodes with a low hydrogen overvoltage, such as high-grade steel, are used.

Advisably, the current density for the method of the invention should be 0.5 to 2.0 A/dm$^2$. Within this range, the formation of quadrivalent tin proceeds optimally. However, it is also possible to work with higher current densities. The potential difference between the electrodes is about 10 volt.

In the event that the doping element is a metal that can be alloyed with tin, the doping element can be introduced into the reaction mixture by using the alloy as the anode. In general, however, it is preferred to add the doping agent in the desired amount to the solution of the tin(IV) oxalate and/or to the oxalates of the polymeric tin(IV) compounds obtained in the first step. As doping agents, alkali metal, ammonium or alkaline earth metal fluorides, as well as tin(II) fluoride and hydrogen fluoride are particularly suitable. As understood in the art, the amount of doping agent is that which is effective to provide the desired electrical conductivity. The atomic ratio of Sn to F or Sb will be mostly 1:0.05-0.3; preferably 0.1-0.2.

Conversion of the tin oxalate and/or the oxalates of the polymeric tin(IV) compounds obtained in the first step into the desired doped tin(IV) oxide can be accomplished in various ways.

For example, it is possible to remove the water from the aqueous solution of tin(IV) oxalate and/or oxalates of polymeric tin(IV) compounds, which contains the doping agent, by means of a spray drier and to calcine the product obtained, preferably at a temperature of 200° to 500° C. If this temperature is exceeded, the tin(IV) oxide formed is obtained partly or completely in crystalline form, which is undesirable from the point of view of the application.

Preferably, the solution of tin(IV) oxalate and/or oxalates of polymeric tin(IV) compounds obtained in the first step and containing the doping agent is worked up, in the second step of the method of the invention, by precipitating the tin(IV) oxalate and/or the oxalates of polymeric tin(IV) compounds by the addition of an at least equivalent amount, based on the oxalate, of ammonium hydroxide solution or ammonium carbonate solution, drying the aqueous dispersion of the precipitated tin oxide hydrate and subsequently converting the hydrate into the oxide at a temperature of 200° to 500° C. The ammonium oxalate in the mixture is decomposed first. By these means, the mixture is loosened up and protected against agglomerating. After the ammonium oxalate has been decomposed, the desired tin(IV) oxide is formed from the oxide hydrate in a very finely divided, amorphous form, which is particularly advantageous from an application point of view.

A further preferred embodiment of the inventive method is characterized in that the tin(IV) oxalate and/or the oxalates of polymeric tin(IV) compounds are precipitated in the second step of the method of the invention by the addition of at least an equivalent amount, based on the oxalate, of sodium hydroxide solution or sodium carbonate solution. The alkali salts are washed out of the precipitate and the tin oxide hydrate is dried and subsequently converted into the oxide at a temperature of 200° to 500° C.

To avoid the formation of coarsened particles, which can happen for example due to agglomeration while drying the tin oxide hydrate, it is advantageous to dry the tin oxide hydrate gently by freeze drying or by vacuum drying at a pressure of $\leq$ 10 mbar and a temperature of $\leq$ 100° C.

The finely divided, doped tin(IV) oxide obtained according to the invention is outstandingly suitable as a filler or pigment in plastics, lacquers, paints, paper, textiles and toners.

The method of the invention is described in greater detail in the following examples, which illustrate the best mode currently contemplated for carrying out the invention and show the superior properties of the products produced thereby. However, the illustrative examples must not be construed as limiting the invention in any manner.

1. Experimental Apparatus

As an electrolysis cell, a 10 L beaker is used with a 0.8 L plastic inner cell, which is provided with two opposite openings and with a device for tightly installing the ion conductor material having an area of 0.5 dm$^2$ each. In the inner cell, the cathode metal sheet is disposed between the two openings and parallel to them. Within the beaker, two anode metal sheets are disposed outside before the openings of the inner cell.

2. Experimental Method

EXAMPLE 1

First step

| | |
|---|---|
| anode: | cast tin sheet |
| anolyte: | 2055 g of oxalic acid dihydrate in 4 L of water by bubbling air through it |
| anolyanolyte agitation: | by bubbling air through it |
| ionic conductor: | cation exchange membrane, commercially obtainable under the name of Nafion 417 |
| cathode: | chromium-nickel steel 18/10 |
| catholyte: | 50 g of oxalic acid dihydrate in 0.5 L of water |
| catholyte agitation: | provided by the evolution of hydrogen |
| voltage: | $\approx$9 volt |
| current: | 4 A |

In the course of the electrolysis, the electrolyte heats up slightly to about 30° C. The loss of water due to electrolysis and evaporation is compensated for by the regular addition of water. After a current of 2441 amp hours has passed through the cell, the anolyte contains 295 g/L of quadrivalent tin.

Second Step

The anolyte (1 L) is treated with 56.4 g of tin(II) fluoride and stirred intensively for 1 hour at 80° C. Subsequently, when the solution has cooled to room temperature, a saturated solution of ammonium bicarbonate is added dropwise. Agglomeration of the precipitate is avoided by using a high-speed stirrer (of the Ultra-Turrax type). When a pH of 5.5 is reached, the addition of ammonium bicarbonate is stopped. The suspension obtained is spray dried. The resulting powder is calcined for 30 minutes in a muffle furnace at 450° C.

A very fine, conductive tin(IV) oxide is obtained with a specific resistance of 6 Ωm (measured on loose powder that has been settled by being shaken) and a specific surface area of 81 m²/g.

EXAMPLE 2

First step

| anode: | cast tin sheet |
| --- | --- |
| anolyte: | the anolyte, obtained in Example 1, is used and diluted with water in the ratio of 1:1 |
| anolyte agitation: | by bubbling air through it |
| ionic conductor: | cation exchange membrane, commercially obtainable under the name of Nafion 417 |
| cathode: | chromium-nickel steel 18/10 |
| catholyte: | 50 g of oxalic acid dihydrate in 0.5 L of water |
| catholyte agitation: | provided by the evolution of hydrogen |
| voltage: | ≃9 to 16 volt |
| current: | 4 A |

In the course of electrolysis, the electrolyte heats up slightly to 35° C. The loss of water due to electrolysis and evaporation is compensated for by the regular addition of water. At a constant current of 4 A, the voltage increases up to 16 V. After a current of 2172 amp hours has passed through the cell, the tin content of the anolyte increases from 147.5 g/L to 300 g/L of quadrivalent tin.

Second Step

The solution obtained (1 L) is stirred with 36 g of a 40% by weight hydrofluoric acid solution and stirred for 2 hours at 60° C. The solution is spray dried and the powder obtained is calcined at 500° C. The powder obtained has a specific surface area of 84 m²/g and a specific resistance of 8 Ωm.

EXAMPLE 3

First Step

| anode: | cast tin sheet |
| --- | --- |
| anolyte: | the anolyte, obtained in Example 1, is used and diluted with water in the ratio of 1:1 |
| anolyte agitation: | by bubbling air through it |
| ionic conductor: | cation exchange membrane, commercially obtainable under the name of Nafion 417 |
| cathode: | chromium-nickel steel 18/10 |
| catholyte: | 50 g of oxalic acid dihydrate in 0.5 L of water |
| catholyte agitation: | provided by the evolution of hydrogen |
| voltage: | ≃9 to 16 volt |
| current: | 4 A |

In the course of electrolysis, the electrolyte heats up slightly to 35° C. The loss of water due to electrolysis and evaporation is compensated for by the regular addition of water. At a constant current of 4 A, the voltage increases up to ≃24 V. After a current of 2629 amp hours has passed through the cell, the tin content of the anolyte increases from 147.5 g/L to 430 g/L of quadrivalent tin. The residual amount of oxalic acid is 24 g/L.

Second Step

The method of Example 2, Step 2, is used. Calcining is carried out at 300° C. After 1 hour, a powder with a specific surface area of 129 m²/g and a conductivity of 17 Ωm is obtained.

EXAMPLE 4

Step 1

The method of Example 1, Step 1, is followed.

Step 2

The solution obtained (1 L) is mixed with 71.5 g of tin(II) fluoride and stirred intensively. The solution is diluted with 5 L of fully deionized water and heated to 80° C. The warm doped tin(IV)-containing solution is now added dropwise to a 2 molar sodium hydroxide solution, which has also been heated to 80° C., until the pH of the solution reaches a value of ≦8.

The precipitate is filtered off and washed with fluoride-containing water. Subsequently, it is dried in a vacuum oven at a temperature of ≦40° C. and a vacuum of less than 1 mbar. The dried product is comminuted mechanically and tempered for 45 minutes at 400° C.

The resulting powder is very lightly colored and has a specific resistance of 18 Ωm and a specific surface area of 87 m²/g.

EXAMPLE 5

Step 1

The method of Example 1, Step 1, is followed.

Step 2

The solution obtained (1 L) is mixed with 71.5 g of tin(II) fluoride and stirred intensively. The solution is diluted with 5 L of fully deionized water and heated to 80° C. The warm doped tin(IV)-containing solution is now added dropwise to a 2 molar sodium carbonate solution, which has also been heated to 80° C., until the pH of the solution reaches a value of ≦8.

After that, the filter residue is freeze dried in five steps, the details of which are given in the following Table.

|  |  | Drying Step | | | | |
| --- | --- | --- | --- | --- | --- | --- |
|  |  | 1 | 2 | 3 | 4 | 5 |
| Starting Temperature* | °C. | −20 | −20 | +20 | +40 | +50 |
| Final Temperature* | °C. | −20 | +20 | +40 | +50 | +50 |
| Running Time | min | 30 | 120 | 120 | 120 | 120 |
| Vacuum | mbar | 0.5 | 0.5 | 0.5 | 0.5 | 0.1 |

*Product temperature, measured by thermocouple

The residue is cooled rapidly to a starting temperature of −20° C. and then brought slowly, under vacuum, to a final temperature of about 50° C. The dried product is comminuted mechanically and tempered for 45 minutes at 400° C.

The resulting powder is very lightly colored and has a specific resistance of 15 Ωm and a specific surface area of 92 m²/g.

We claim:

1. A method for the preparation of finely divided electrically conductive tin(IV) oxide, in which, in a first step, an aqueous solution of oxalate containing tin(IV) oxalate, oxalates of polymeric tin(IV) compounds or a combination thereof is prepared and in a second step, the tin(IV) oxalate, oxalates of polymeric tin(IV) or combination thereof from the aqueous solution obtained in the first step is calcined to produce tin(IV) oxide, comprising, in the first step, carrying out electrolysis to produce the aqueous solution of oxalate under conditions wherein:
(a) the anode is comprised of tin or a tin alloy containing a doping metal,
(b) the cathode is comprised of metal or graphite,
(c) the two electrodes are separated from one another by a diaphragm or an organic membrane which is permeable to hydrogen ions and
(d) an aqueous oxalic acid is used as electrolyte and in the second step, calcining the tin(IV) oxalate, oxalates of polymeric tin(IV) compounds or a combination thereof to produce tin(IV) oxide, with the proviso that a doping agent is added to the solution of oxalate before calcination when the anode is comprised of tin.

2. The method of claim 1, in which the electrolyte is a saturated aqueous solution of oxalic acid containing an excess of undissolved oxalic acid.

3. The method of claim 1 in which the anode material is a tin-antimony alloy having an antimony content corresponding to the degree to which the tin oxide is to be doped.

4. The method of claim 1, in which the second step comprises adding at least an equivalent amount, based on the oxalate, of ammonium hydroxide solution or ammonium hydrogen carbonate solution to the tin(IV) oxalate, oxalates of polymeric tin(IV) compounds or combination thereof to precipitate tin oxide hydrate as an aqueous dispersion, drying the aqueous dispersion of tin oxide hydrate and subsequently converting the tin oxide hydrate into tin oxide at a temperature of 200° to 500° C.

5. The method of claim 1, in which the second step comprises adding at least an equivalent amount, based on the oxalate, of sodium hydroxide solution or sodium carbonate solution to the solution of tin(IV) oxalate, oxalates of polymeric tin(IV) compounds or combination thereof to precipitate alkali metal salts and tin oxide hydrate, washing alkali metal salts out of the precipitate, drying the tin oxide hydrate and subsequently converting the tin oxide hydrate to tin oxide at a temperature of 200° to 500° C.

6. The method of claim 4, in which the tin oxide hydrate is dried gently by freeze drying or by vacuum drying at a pressure of $\leq 10$ mbar and at a temperature of $\leq 100°$ C.

7. The method of claim 5, in which the tin oxide hydrate is dried gently by freeze drying or by vacuum drying at a pressure of $\leq 10$ mbar and at a temperature of $\leq 100°$ C.

8. The method of claim 1, in which the anode is comprised of tin and an inorganic fluoride is added as the doping agent to the aqueous solution of oxalate in the second step.

9. A filler useful for plastics, lacquers, paints, paper, textiles and toners comprising the tin(IV) oxide, prepared according to claim 1.

10. A pigment useful for plastics, lacquers, paints, paper, textiles and toners comprising the tin(IV) oxide, prepared according to claim 1.

* * * * *